United States Patent
Canterberry et al.

(12) 
(10) Patent No.: US 6,857,657 B2
(45) Date of Patent: Feb. 22, 2005

(54) INFLATOR HAVING A SUPPORT MEMBER CAPABLE OF SLIDING TO OPEN THE PRESSURE VESSEL

(75) Inventors: J B Canterberry, Apollo Beach, FL (US); Robert Mark Spangler, Plant City, FL (US)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 10/407,274

(22) Filed: Apr. 7, 2003

(65) Prior Publication Data

US 2004/0195812 A1 Oct. 7, 2004

(51) Int. Cl.⁷ ................................................ B60R 21/26

(52) U.S. Cl. ........................................ 280/737; 280/741

(58) Field of Search ................................. 280/737, 741, 280/742, 736

(56) References Cited

U.S. PATENT DOCUMENTS

| | | | |
|---|---|---|---|
| 5,664,804 A | * | 9/1997 | Saccone ...................... 280/737 |
| 6,010,153 A | | 1/2000 | Halas et al. ................. 280/737 |
| 6,247,725 B1 | | 6/2001 | Moller ........................ 280/737 |
| 6,499,764 B2 | * | 12/2002 | Anacker et al. ............ 280/737 |
| 6,676,157 B2 | * | 1/2004 | Nanbu ........................ 280/736 |
| 2002/0074036 A1 | | 6/2002 | Specht et al. ............ 137/68.13 |

* cited by examiner

Primary Examiner—Eric Culbreth
(74) Attorney, Agent, or Firm—Lonnie Drayer; Jarett Rieger

(57) ABSTRACT

An inflator has a tubular member with a sealing element hermetically sealing the open end of the tubular member. The tubular member and the sealing element form a pressure vessel for storing inert gas. The inflator has a support member for supporting the sealing element. The support member prevents the forces associated with the inert gas from driving the sealing element apart from the tubular member. During a crash situation, the support member is displaced, which allows the inert gas to burst the sealing element. Consequently, the inert gas has an unobstructed path to flow out of the inflator.

9 Claims, 2 Drawing Sheets

INFLATOR HAVING A SUPPORT MEMBER CAPABLE OF SLIDING TO OPEN THE PRESSURE VESSEL

FIELD OF THE INVENTION

The invention relates to an inflator for providing inflation gas to fill an inflatable restraint device, and particularly relates to an inflator that utilizes a stream of hot gas to puncture a support member allowing inert gas to exit the inflator.

BACKGROUND OF THE INVENTION

A vehicle airbag is an inflatable restraint device that is deployed during a car crash to protect a vehicle occupant from sustaining injury. In order to prevent the vehicle occupant from colliding with the instrument panel or steering wheel during a frontal crash or the intruding door during a side collision, the airbag needs to be inflated within a fraction of a second. To meet the stringent time demands placed upon the airbag, a gas supply source needs to be able to quickly release inflation gas into the vehicle airbag. One type of gas supply source that is known in the art is a cold gas inflator that stores a quantity of stored pressurized gas. This type of inflator operates by releasing the inert gas to inflate the airbag. Another common type of inflator known in the art is the hybrid inflator, which includes a heating component and an inert gas component. This type of inflator operates by releasing a mixture of hot gas and inert gas.

A representative hybrid inflator is taught in U.S. Pat. No. 6,010,153, which is incorporated herein in its entirety. The hybrid inflator has a pressure vessel for storing a pressurized gas and a pyrotechnic heater assembly having a pyrotechnic heating material. Upon receiving an activating signal, an igniter ignites the pyrotechnic heating material, which in turn causes the pressure vessel to open. The hot gaseous products from the pyrotechnic heating material and the inert gas exit the inflator.

For cold gas inflators, the inert gas is retained in the pressure vessel by a sealing element. The sealing element blocks the discharge opening of the pressure vessel so that inert gas cannot exit the inflator. In order for the cold gas inflator to release inert gas, the sealing element must be ruptured or destroyed. U.S. Pat. No. 6,247,725 B1 teaches a cold gas inflator having a sealing element for blocking the inert gas from exiting the pressure vessel. A supporting member that is sandwiched between the sealing element and a counterbearing supports the sealing element. The cold gas inflator has a triggering device that when activated removes the support member for the sealing element. Without the support member, the sealing element will burst because it cannot withstand the pressure from the inert gas. US 2002/0074036 A1 also teaches a cold gas inflator that has a support member, and this published patent application is incorporated herein in its entirety by reference. The sealing element is located in the gas discharge opening with a support member adjacent thereto. A locking element is disposed in a locking position between a side of the support member and a first abutment. A second abutment also supports the support member. A gas releasing device moves the locking element, which causes the sealing element and support member to burst thereby providing an unobstructed discharge opening for the escape of the inert gas.

While various approaches for opening a pressure vessel having a support member are taught in the prior art, there is a need to develop cheaper opening devices for both cold gas inflators as well as hybrid inflators.

SUMMARY OF THE INVENTION

An inflator in accordance with the present invention has a tubular member and a sealing element forming a pressure vessel. The pressure vessel is filled with inert gas, and a support member prevents the forces associated with the inert gas from failing the sealing element. Upon receipt of an activating signal from an electronic control unit, the inner portion of the support member is severed from the outer portion, and the force of the inert gas causes the sealing element to fail. Consequently, the inert gas has an unobstructed path to the exit ports of the inflator.

An aspect of the present invention is the use of a pyrotechnic material to heat the inert gas. The firing of the igniter produces sufficient heat to ignite the pyrotechnic material. The hot combustion gas from the pyrotechnic material has sufficient output energy to punch a hole in the support member causing the sealing element to fail.

DETAILED DESCRIPTION OF THE INVENTION

Figure 1:
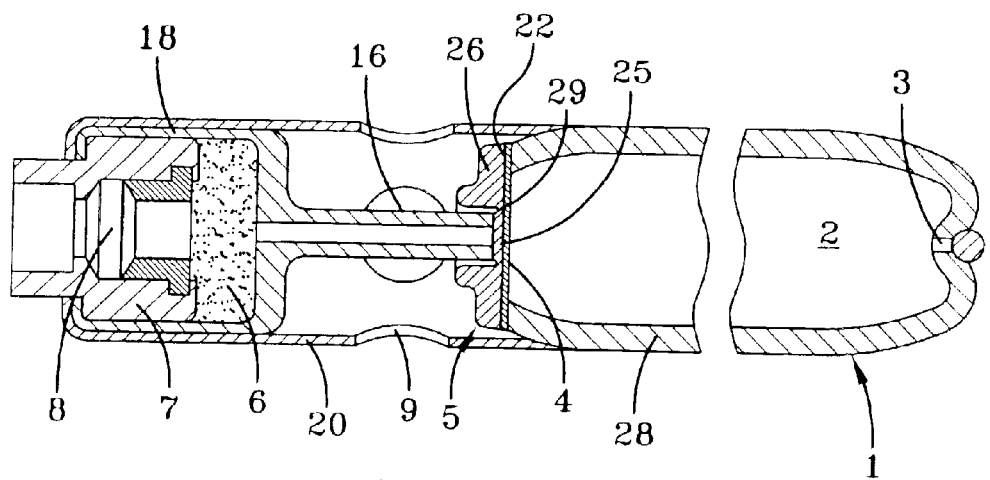
FIG. 1 shows a hybrid inflator with a support member.

With reference to FIG. 1, a hybrid inflator has both pyrotechnic heating material 6 and inert gas 2. The inflation gas exiting the inflator during a crash situation is a combination of the combustion products from the burning of the pyrotechnic heating material 6 and the inert gas 2. The purpose of the pyrotechnic heating material 6 is three-fold. First and foremost, the heating material heats the inert gas 2 or increases the kinetic energy of the inert gas 2 whereby increasing the flow rate of the inert gas 2. Second, the pyrotechnic heating material 6 provides combustion gas, which increases the total mole output of the inflation gas. The third benefit of the hot pyrotechnically generated gas is to replace the thermal energy the cold gas looses upon expansion and thereby maintain sufficient volume to fill the airbag.

In the event of a car accident or crash, an electronic control unit or master controller actuates the hybrid inflator by transmitting a signal thereto. The electronic control unit communicates with one or more sensors. Various types of sensors may be employed that measure acceleration or deceleration as well as vehicle occupant position. The electronic control unit processes the data from the sensors and determines whether the airbag should deploy. If the electronic control unit determines that a car crash has occurred or is imminent the electronic control unit will send an electric signal to the igniter 8 of the hybrid inflator. The igniter 8 is an electrical device, which initiates the deployment of the inflator when a suitable electric current is passed through an ignition resistor embedded in one or more layers of a pyrotechnic composition. The pyrotechnic composition or ignition material and load weight contained within the igniter 8 are designed to generate sufficient heat to ignite the pyrotechnic heating material 6. An example of a suitable ignition material for the present invention is zirconium potassium perchlorate, however, one skilled in the art realizes that other ignition materials could be used in the present invention. The igniter 8 may be of the standard direct fire design, receiving the firing current directly from the electronic control unit, or the igniter may be of an advanced design which communicates with the electronic control unit by digital signals and which contains on board the igniter an ASIC (application specific integrated circuit), firing capacitor, and related components.

As seen in FIG. 1, the igniter 8 is attached to an endcap 7 by crimping the endcap 7 to the igniter 8. The endcap 7 secures the igniter 8 to the diffuser 20. The igniter 8 may, if desired, be secured to the endcap 7 by threads, welding, adhesive, or any other suitable means. The endcap 7 is made from a metal, an alloy, or an injected molded plastic.

Adjacent to the igniter 8 is the pyrotechnic heating material 6. The heating material employed may be boron potassium nitrate ($BKNO_3$), which is well known in the art. Alternatively, the heating material may be selected from a formulation taught in a commonly assigned patent, U.S. Pat. No. 6,214,138, which is incorporated herein in its entirety by reference. The formulations taught in said patent contain a non-azide fuel, an oxidizer, and a metal. The preferred embodiment in said patent contains 5-aminotetrazole, strontium nitrate, boron nitride, mica, and aluminum. The pyrotechnic heating material 6 provides reliable and consistent production of hot gas to heat the inert gas 2 in the hybrid inflator.

The hybrid inflator shown in FIG. 1 also has a housing 18 partially surrounding the endcap 7. The housing 18 is crimped to the endcap 7; however, other attachment means are also within the scope of the present invention. The endcap 7, the igniter 8, and the housing 18 define a cavity for the occupation of the pyrotechnic heating material 6. The housing 18 has an opening on one end and on the opposite end, a jet tube 16 extends therefrom. The jet tube 16 serves two roles. First, the jet tube 16 provides support for the support member 5 retaining the support member 5 firmly against the sealing element 4. Second, the jet tube 16 provides a passageway for hot gas to flow from the pyrotechnic heating material 6 to the inert gas 2 in the pressure vessel 1.

The jet tube 16 extends from the pyrotechnic heating material 6 to the support member 5, and the jet tube 16 has substantially a uniform diameter therethrough. The jet tube 16 is disposed in the inflator so that the longitudinal axis passing therethrough is substantially perpendicular to the length of the support member 5. As utilized herein, the length of the support member 5 denotes the largest dimension of the support member 5. The length of the jet tube 16 is defined as the dimension of the jet tube that is parallel with the longitudinal axis of the jet tube. The length of the tube 16 is longer than the diameter of the exit port of the diffuser.

As mentioned earlier, the jet tube 16 provides support for the support member 5. The jet tube 16 is of paramount importance because the jet tube 16 retains the support member 5 firmly against the sealing element 4. The inert gas 2 has a high pressure associated therewith, and the inert gas 2 exerts force on the sealing element 4. If the support member 5 is displaced and hence not supporting the sealing element 4, then the force from the inert gas 2 on the sealing element 4 is sufficient to cause failure of the sealing element 4 creating an opening for the inert gas 2 to escape the pressure vessel.

Figure 1A:
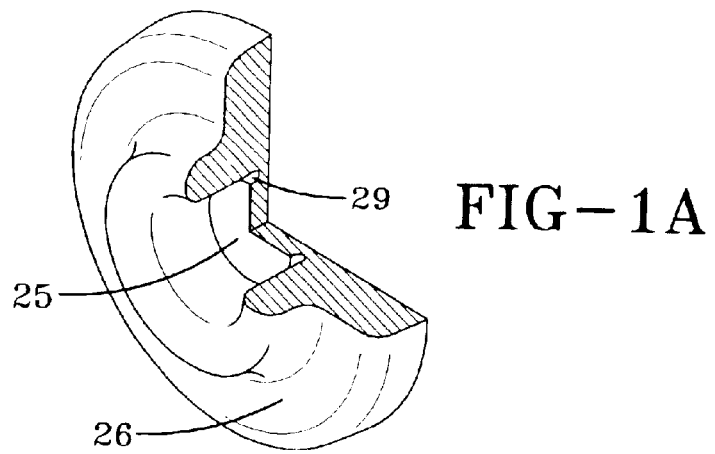
FIG. 1A shows a perspective view of a partially sectioned support member.

The support member 5 as seen in FIG. 1A has a flat bottom 22 (bottom utilized herein denotes the portion of the support member 5 facing the inert gas 2) and has substantially a disk shape. The support member has a circular groove 29 creating a weak area in the support member 5. The weak area is defined as a circular ring formed from the trough of the circular groove 29 to the bottom 22 of the support member 5. The weak area has a radius associated thereto, and the weak area divides the support member 5 into an outer portion 26 and an inner portion 25. The inner portion 25 of the support member has a radius less than the radius of the weak area while the outer portion 26 has a radius that is greater than the radius of the weak area. The inner portion 25 of the support member 5 is the portion of the support member 5 that is generally between the jet tube 16 and the sealing element 4.

The sealing element 4 provides a hermetic seal for the pressure vessel 1. The sealing element 4 is circumferentially welded to the open end of the tubular member 28. The tubular member 28 and the sealing element 4 collectively define a space for confining the inert gas 2, and the tubular member 28 and the sealing element 4 form the pressure vessel 1 of the hybrid inflator. The sealing element 4 has a diameter that is substantially the same as the diameter for the tubular member 28. The pressure from the inert gas 2 inside the pressure vessel 1 does not cause the sealing element 4 to bulge outward in the direction of the igniter 8 because of the presence of the support member 5. The sealing element 4 prevents inert gas 2 from escaping the pressure vessel 1, however, the sealing element 4 alone does not have the strength to prevent bursting by the inert gas 2. The support member 5 reinforces the sealing element 4 precluding bursting of the sealing element 4.

The pressure vessel 1 is filled with helium, argon, nitrogen, or any other suitable pressurized gas. The pressure vessel 1 is filled through the fill port 3 and after filling is completed, the fill port 3 is sealed with a weldable pallet. While the pressure vessel 1 shown has a generally cylindrical shape, it is understood that a pressure vessel 1 having a spherical shape may also be used in the practice of the present invention. The tubular member 28 may be formed of stainless steel, low carbon steel, or any other suitable material that has sufficient strength to withstand the high pressures associated with the inert gas 2 and has extremely low permeability to the inert gas 2.

The tubular member 28 and the endcap 7 holder are both secured to the diffuser 20 by laser, TIG (tungsten inert gas), or friction welding. The diffuser 20 has a plurality of apertures, which serve as the exit ports 9 for the inflator. The exit ports allows the inflation gas to evenly disperse in 360°. This enables the airbag (not shown) to fill evenly without the need for other hardware such as a manifold.

Figure 4:
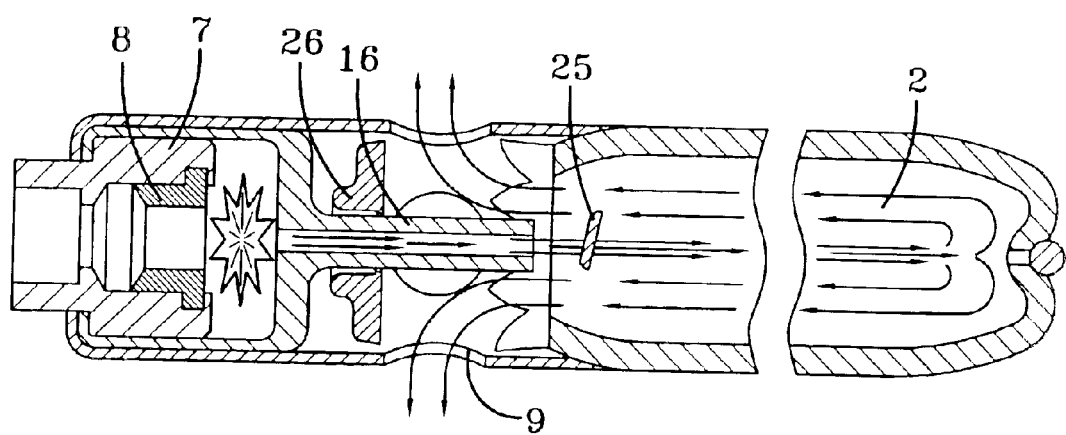
FIG. 4 shows the hybrid inflator from FIG. 1 having a displaced support member and ruptured sealing element.

The operation of the hybrid inflator in FIG. 1 will now be discussed. Upon receiving an electric signal from the electronic control unit in response to a vehicle collision requiring deployment of the inflatable restraint, the igniter 8 fires. This ignites the ignition material within the igniter 8, which in turn ignites the pyrotechnic heating material 6. The burning of the pyrotechnic heating material 6 yields hot gas and a shock wave that travels along the jet tube 16. The hot gas and shock wave will sever the inner portion 25 from the outer portion 26 along the weak area of the support member. The weak area is characterized by having the thinnest width of the support member 5. Once the inner portion 25 has been punched from the outer portion 26, the stored pressure in the pressure vessel 1 is able to fail cause failure of the sealing element 4. The outer portion 26 of the support member 5 is then displaced by the inert gas 2 in the direction of the endcap 7 holder so the inert gas 2 has an unblocked path towards the exit ports 9. The gas flow of the inert gas 2 from the pressure vessel 1 to outside the inflator as well as the support member broken into an inner portion 25 and an outer portion are depicted in FIG. 4. The hybrid inflator in accordance with the present invention will also function without the presence of a groove 29 or weak area. As long as the shock wave severs the outer portion 26 from the inner portion 25 of the support member 25, the pressure from the inert gas 2 will cause the sealing element 4 to burst. Additionally, a projectile (not shown) may be employed for aiding in puncturing of the support member. The projectile may be disposed along the jet tube, and the burning of the pyrotechnic heating material 6 will propel the projectile towards the support member.

Figure 2:
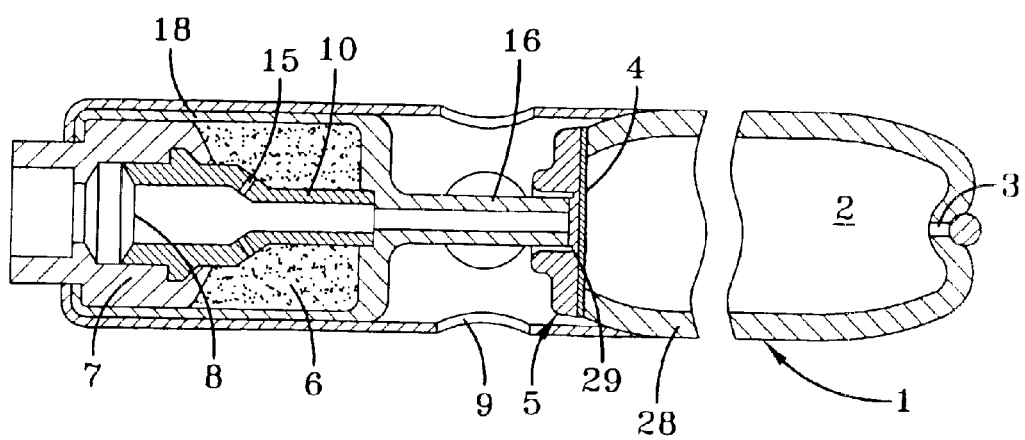
FIG. 2 shows a hybrid inflator with a support member according to a second embodiment.

FIG. 2 shows an alternate embodiment for the present invention. The inflator shown in FIG. 2 is also a hybrid inflator since the inflator has pyrotechnic heating material 6 and inert gas 2. The inflator in FIG. 2 differs from the hybrid inflator in FIG. 1 because the inflator in FIG. 2 has an igniter tube 10. The igniter tube is aligned with the jet tube 16 so there is a passageway for gas to flow from the ignition material in the igniter 8 to the inner portion 25 of the support member 5. The diameter of the igniter tube is at least equivalent to the diameter of the jet tube 16. Another feature of the igniter tube is the existence of a plurality of holes 15. The pyrotechnic heating material 6 is arranged in the cavity formed by the endcap 7, the housing 18, and the igniter tube 10. Upon the inflator in FIG. 2 receiving an electrical signal, the ignition material is ignited forming small amounts of gas. Some of this gas flows through the igniter tube 10 to the jet tube 16, while the remainder of the gas flows through the plurality of holes 15 in the igniter tube 10 to the cavity containing the pyrotechnic heater material. The interaction between the gas from the ignition material and the pyrotechnic heater material causes the pyrotechnic heater material to be ignited. The hot gas generated flows through the plurality of holes 15 in the igniter holder toward the support member 5. The output energy associated with the hot gas causes the support member 5 to be punctured as described above, which leads to the rapid flow of inert gas 2 through the exit ports 9.

Figure 3:
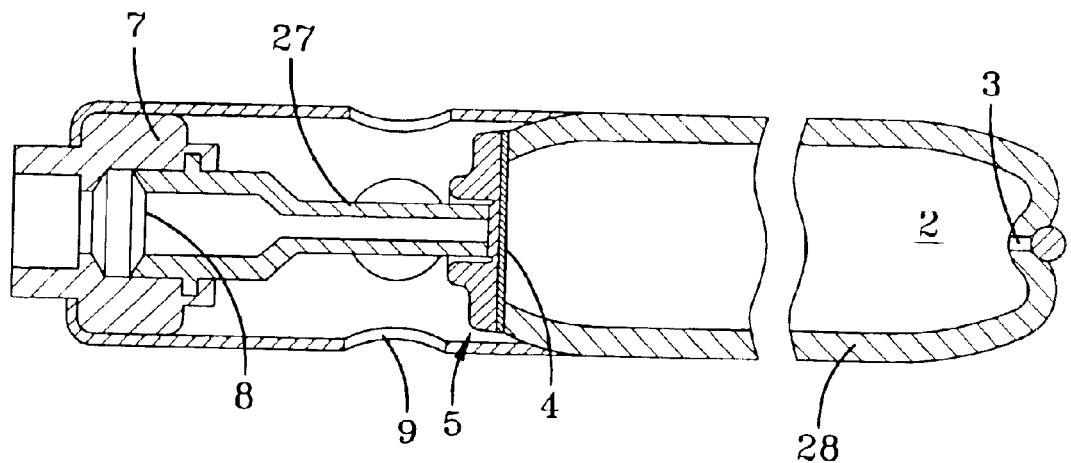
FIG. 3 shows a cold gas inflator with a support member according to a third embodiment.

A third embodiment is illustrated in FIG. 3, which shows a cold gas inflator as opposed to a hybrid inflator. This inflator is considered a cold gas inflator because the inflator lacks a pyrotechnic heater material. The inflator has an extended jet tube 27 that provides support to the support member 5. In addition, the jet tube 16 provides the passageway for the shock wave and gases from the ignition blast of the igniter 8 to the support member 5. Upon receipt of an electrical signal from an electronic control unit, the igniter 8 generates heat to cause the ignition material to burn. The gases from the burning of the ignition material travel along the extended jet tube 27 to the support member 5, whereby the output energy from the gas is sufficient enough to punch the inner portion 25 out of the support member 5. Consequently, the sealing element 4 fails and inert gas 2 flows out of the inflator.

The preferred embodiments have been described herein. It will be apparent to those skilled in the art that the above methods may incorporate changes and modifications without departing from the general scope of this invention. It is intended to include all such modifications and alterations in so far as they come within the scope of the appended claims or the equivalents thereof.

We claim:

1. An inflator comprising:
   a tubular member having an open end;
   a sealing element for blocking an inert gas from escaping the tubular member, the sealing element connected to the open end of the tubular member;
   a support member for supporting the sealing element having an outer portion and an inner portion, the inner portion of the support member generally disposed between a tube and the sealing element, the tube providing a passageway for a combustion gas produced from an igniter to the inner portion of the tube, wherein a stream of combustion gas punches the inner portion out of the support member;
   a pyrotechnic heating material disposed adjacent to an igniter;
   wherein the tube is a jet tube providing a passageway from the pyrotechnic heating material to the support member, wherein ignition of the pyrotechnic heating material generates combustion gases that travel along the jet tube to the support member; and
   an igniter tube disposed between the igniter and the jet tube, wherein combustion gas from the pyrotechnic material travels from the igniter to the jet tube.

2. The inflator according to claim 1 wherein the sealing element has a diameter substantially equal to the diameter of the tubular member.

3. The inflator according to claim 1 wherein the support member has substantially a symmetrical shape, wherein a longitudinal axis of the jet tube is substantially perpendicular to a length of the support member.

4. The inflator according to claim 1 wherein the outer portion of the support member has a greater thickness than the inner portion of the support member.

5. The inflator according to claim 1 wherein the length of the jet tube is longer than the diameter of an exit hole.

6. The inflator according to claim 1 wherein the support member has a circular groove for creating a weak area, wherein the circular groove divides the support member into the inner portion and the outer portion.

7. An inflator comprising:
   a tubular member having a first end;
   a sealing element secured to the first end of the tubular member, wherein the tubular member and the sealing element form a pressure vessel for storing inert gas;
   a support member for supporting the sealing element for partially receiving a tube;
   a means for punching a hole in the support member;
   a pyrotechnic heating material disposed adjacent to an igniter;
   wherein the tube is a jet tube providing a passageway from the pyrotechnic heating material to the support member, wherein ignition of the pyrotechnic heating material generates combustion gases that travel along the jet tube to the support member; and
   an igniter tube disposed between the igniter and the jet tube, wherein the combustion gas from the pyrotechnic material travels from the igniter to the jet tube.

8. The inflator according to claim 7 wherein the support member has substantially a symmetrical shape, wherein a longitudinal axis of the jet tube is substantially perpendicular to a length of the support member.

9. The inflator according to claim 7 wherein the length of the jet tube is longer than the diameter of an exit hole.

* * * * *